(12) United States Patent
Wilson

(10) Patent No.: US 7,607,635 B2
(45) Date of Patent: Oct. 27, 2009

(54) FLUSH VALVE HANDLE ASSEMBLY PROVIDING DUAL MODE OPERATION

(75) Inventor: John R. Wilson, Naperville, IL (US)

(73) Assignee: Sloan Valve Company, Franklin Park, IL (US)

( * ) Notice: Subject to any disclaimer, the term of this patent is extended or adjusted under 35 U.S.C. 154(b) by 654 days.

(21) Appl. No.: 11/211,273

(22) Filed: Aug. 25, 2005

(65) Prior Publication Data

US 2006/0151729 A1  Jul. 13, 2006

(51) Int. Cl.
*F16K 31/12* (2006.01)
(52) U.S. Cl. .......................................... 251/40; 251/38
(58) Field of Classification Search .................. 251/38, 251/40
See application file for complete search history.

(56) References Cited

U.S. PATENT DOCUMENTS

| | | | |
|---|---|---|---|
| 605,621 A | 6/1898 | Acklin |
| 1,114,398 A | 10/1914 | Sloan |
| 1,519,654 A | 12/1924 | Banta |
| 1,868,520 A | 7/1932 | Brooks |
| 1,868,591 A | 7/1932 | Tanner |
| 1,896,950 A | 2/1933 | Groeniger |
| 1,912,937 A | 6/1933 | George |
| 2,038,135 A | 4/1936 | Sloan |
| 2,136,221 A | 11/1938 | Sloan |
| 2,164,760 A | 7/1939 | Wesson |
| 2,210,860 A | 8/1940 | Ragnell |
| 2,369,104 A | 2/1945 | Fredrickson |
| 2,472,576 A | 6/1949 | Dobrick |
| 2,612,187 A | 9/1952 | Romanelli et al. |
| 2,620,826 A | 12/1952 | Johns |
| 2,734,712 A | 2/1956 | Fraser |
| 2,738,946 A | 3/1956 | Filliung |
| 2,858,846 A | 11/1958 | Parker |
| 3,085,779 A | 4/1963 | Philippe |
| 3,207,467 A | 9/1965 | Buhller |
| 3,399,860 A | 9/1968 | Billeter et al. |
| 3,406,940 A | 10/1968 | Kertell |
| 3,695,254 A | 10/1972 | Blum |
| 3,778,023 A | 12/1973 | Billeter |
| 3,806,962 A | 4/1974 | Sievers |
| 4,022,380 A | 5/1977 | Scragg |
| 4,134,570 A | 1/1979 | Walker |

(Continued)

OTHER PUBLICATIONS

Six-Liter Water Closets Equipped with a Dual Flushing Device, ASME A112.19.14-2001, 1 page.

*Primary Examiner*—John K Fristoe, Jr.
(74) *Attorney, Agent, or Firm*—Foley & Lardner LLP

(57) ABSTRACT

A dual mode flush valve includes a handle assembly having a handle, a bushing and a plunger. The bushing has a sleeve with a passage therethrough for mounting the plunger for sliding and tilting. The passage is defined by first and second partially overlapping bores that coincide at the inner end of the sleeve and are spaced one above the other at the outer end of the sleeve. The bores define a horizontal plunger travel axis and an angled plunger travel axis. Depending on which direction the user actuates the handle the plunger will travel along one of these axes. Travel along the angled axis will lower the plunger tip, allowing earlier clearance of a relief valve and a reduced flow through the flush valve compared to actuation with the plunger travel along the horizontal axis.

35 Claims, 4 Drawing Sheets

U.S. PATENT DOCUMENTS

| | | | |
|---|---|---|---|
| 4,202,525 A | 5/1980 | Govaer et al. |
| 4,272,052 A | 6/1981 | Gidner |
| 4,327,891 A | 5/1982 | Allen et al. |
| 4,576,272 A | 3/1986 | Morgan, Jr. et al. |
| 4,817,913 A | 4/1989 | Whiteside |
| 4,883,254 A | 11/1989 | Whiteside |
| 4,893,645 A | 1/1990 | Augustinas et al. |
| 5,026,021 A | 6/1991 | Pino |
| 5,062,453 A | 11/1991 | Saadi et al. |
| 5,244,179 A | 9/1993 | Wilson |
| 5,415,374 A | 5/1995 | Carroll et al. |
| 5,431,181 A | 7/1995 | Saadi et al. |
| 5,476,244 A | 12/1995 | Carroll et al. |
| 5,497,802 A | 3/1996 | Whiteside |
| 5,505,427 A | 4/1996 | Whiteside |
| 5,535,781 A | 7/1996 | Paterson et al. |
| 5,730,415 A | 3/1998 | Gronwick |
| 5,881,993 A | 3/1999 | Wilson et al. |
| 6,019,343 A | 2/2000 | Tsai |
| 6,056,261 A | 5/2000 | Aparicio et al. |
| 6,189,554 B1 | 2/2001 | Pino |
| 6,227,219 B1 | 5/2001 | Pino |
| 6,299,127 B1 | 10/2001 | Wilson |
| 6,408,873 B1 | 6/2002 | Hall et al. |
| 6,442,772 B2 | 9/2002 | Han et al. |
| 6,554,018 B1 | 4/2003 | Pino |
| 6,785,913 B2 | 9/2004 | Ho |
| 2002/0047102 A1 | 4/2002 | Hankin et al. |
| 2003/0089867 A1 | 5/2003 | Hall et al. |
| 2006/0033060 A1 | 2/2006 | Funari |

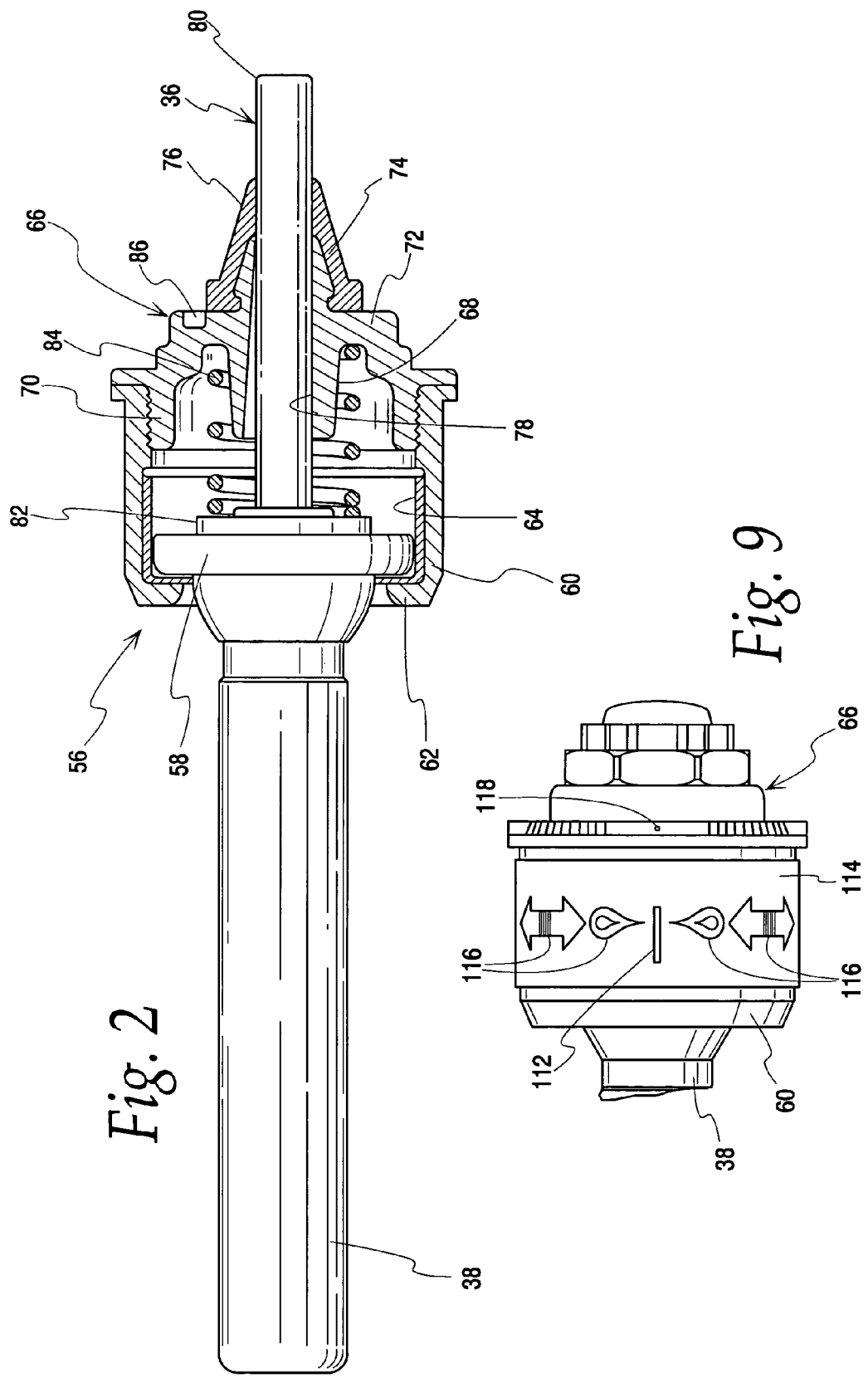

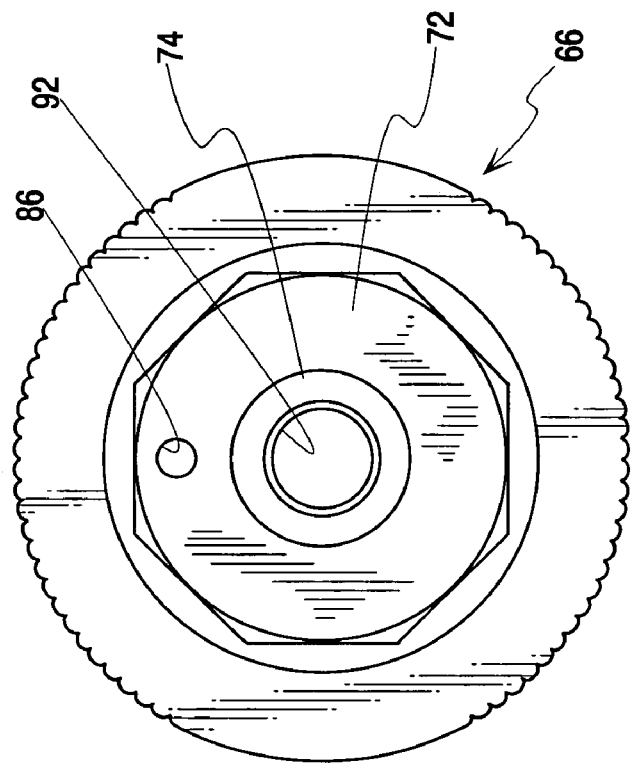
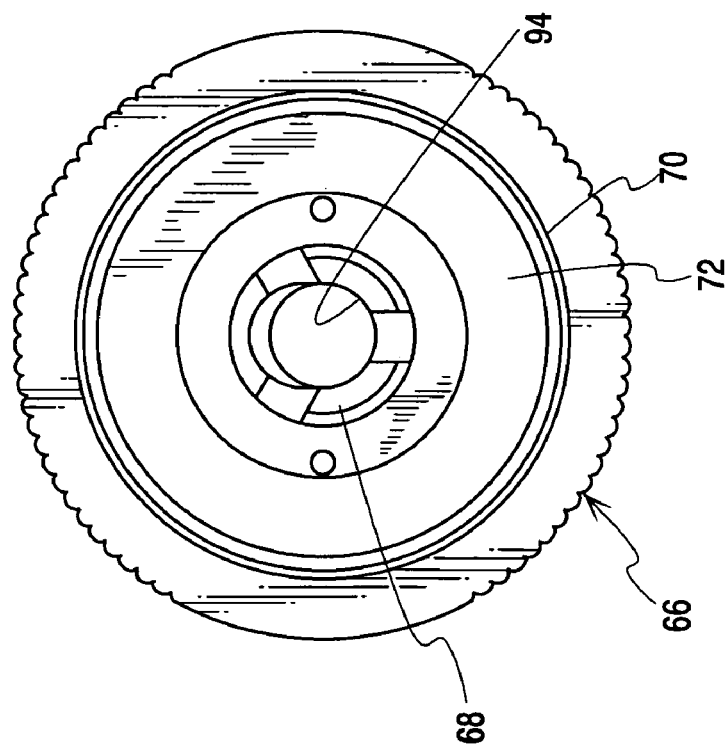

FLUSH VALVE HANDLE ASSEMBLY PROVIDING DUAL MODE OPERATION

BACKGROUND OF THE INVENTION

The present invention relates to flush valves for use with plumbing fixtures such as toilets, and more specifically to improvements in the bushing of the actuating handle assembly that will provide for user-selectable, dual mode operation of the flush valve.

Conservation of water resources in the use of toilets can be achieved by allowing a user to select the volume of water required to clean the fixture. For liquid waste a reduced flush volume is adequate. For solid waste a full flush is necessary. Based on the user's determination of whether a larger or smaller flush volume is appropriate to clean the bowl, a flush valve can be operated to provide a larger or smaller volume. Flush valves of this type can be designated dual mode flush valves.

The prior art includes dual mode flush valves. U.S. Pat. No. 2,738,946 has a handle assembly which allows a user to choose either a low volume flush or a full volume flush depending on the axial direction of handle activation. The flush handle assembly includes a plunger having a U-shaped member attached to the inner end thereof. The U-shaped member surrounds the bottom of the relief valve sleeve with legs which have different lengths. Upon activation of the handle one of the U-shaped member's legs will engage the relief valve sleeve and unseat the relief valve. The resulting upward movement of the relief valve will cause the sleeve to clear the leg of the U-shaped member and reseat. Reseating will happen at different times due to the different lengths of the legs. Accordingly, the relief valve reseats either later or sooner depending on which leg engaged the sleeve. Timing of the relief valve closure is one of the factors which governs the length of time the flush valve is open. Therefore the relief valve closure can be used to control how much water flows through the valve during a flush. In this construction the plunger moves only along a horizontal axis regardless of how the handle is actuated. Also, pushing or pulling the handle in a horizontal plane will not activate the valve.

Another attempt to create a dual mode flush valve is shown in U.S. Pat. No. 4,134,570. This valve shows various ways to limit the actuating handle movement, with the intent of limiting the amount of horizontal plunger travel when the user wants to select the minimum flush volume. However, there is no provision for altering the relief valve reseating time. Whether the relief valve sleeve is tilted a small or large amount, the relief valve still cannot reseat until either the diaphragm lifts the sleeve clear of the plunger or the user releases the handle. Therefore, this construction will either fail in practice to produce significant differences in flow volumes or the flow volume will depend on how quickly the user releases the actuating handle. The latter will result in variable and unpredictable flush volumes or incomplete opening of the valve.

SUMMARY OF THE INVENTION

The present invention is directed to a dual mode flush valve which allows the user to select the amount of water that will flow, depending on the amount of water required to clean a fixture. Except for the handle bushing and socket the valve may be conventional. It includes a valve body with an inlet and outlet and a valve seat between the inlet and outlet. A valve member is movable in and out of engagement with the valve seat to open and close the valve. A pressure chamber defined between the valve member and the top of the valve body controls opening and closing of the valve member. A relief valve mounted on the valve member opens and closes the pressure chamber. The relief valve includes a stem and sleeve mounted in telescoping relation. These extend to a point where at least the sleeve is adjacent to a plunger that is actuated by a handle mounted to the valve body.

The plunger is mounted in a bushing. The bushing has a sleeve with a passage defined therein. The plunger extends through the passage. The sleeve has an inner end and an outer end. The passage is defined by first and second bores which partially overlap. The bores coincide at the inner end of the sleeve but are spaced one above the other at the outer end of the sleeve. Thus, the passage has a generally circular opening at the inner end and a somewhat oval shape at the outer end of the sleeve. The bores define a horizontal axis of plunger travel and an angled axis of plunger travel. In a preferred embodiment the angled axis is in a vertical plane with the outer end of the bore at a higher elevation than the inner end of the bore. Thus, when the plunger travels along the angled axis the tip of the plunger contacts the relief valve sleeve at a lower point than is the case when the plunger travels along the horizontal axis. The lower point of contact allows the relief valve sleeve to clear the plunger sooner, resulting in earlier closure of the relief valve and reduced open time for the valve, which of course means a reduced flow amount through the valve.

The flush volumes are selected by choosing the direction of handle actuation. Actuation in an upward vertical direction will tilt the plunger up and cause it to travel on the angled plunger travel axis. This reduces flow as just described. Actuation of the handle in any other direction will not tilt the plunger and it will move in the horizontal axis, resulting in a full flush cycle.

The handle assembly includes a socket that is engageable with the valve body of the flush valve. The socket includes an exterior portion that is visible on the exterior of the valve body when the handle assembly is installed on the valve body. Since the conventional handle assembly is symmetrical about the plunger axis, the handle assembly can be installed on the valve body in any orientation without affecting its performance. However, in the preferred embodiment of the present invention, the handle assembly is not symmetrical about the plunger axis. Instead it has to be installed in a particular orientation for it to perform as intended. The problem is the non-symmetrical portion of the handle assembly is not visible to the installer. Accordingly, in one aspect the present invention provides a mark on the visible portion of the socket that indicates to the installer where the non-symmetrical portion of the bushing passage is. This allows the installer to properly orient the bushing relative to the valve body.

One of the advantages of the present invention is that it allows a user to conserve water while the bushing is compatible with existing valves. Another advantage is it permits the valve to be actuated by pushing or pulling the handle in any direction, which is what most users are accustomed to. Only actuation in a particular direction will result in a reduced flush, but all other directions are still available for a normal or full volume flush. The present invention also utilizes the inherent static forces internal to the handle assembly during activation to bias the plunger's transverse direction. A further advantage of the invention is it uses the existing plunger seal. The bushing geometry where the seal is located is the same as the standard bushing. The plunger traveling on the angled axis will slightly tilt the existing plunger seal but not sufficiently to adversely affect it.

These and other desired benefits of the invention, including combinations of features thereof, will become apparent from the following description. It will be understood, however, that a device could still appropriate the claimed invention without accomplishing each and every one of these desired benefits, including those gleaned from the following description. The appended claims, not these desired benefits, define the subject matter of the invention.

BRIEF DESCRIPTION OF THE DRAWINGS

FIG. 2 is a section through a handle assembly of the present invention.

FIG. 3 is a left end elevation view of the handle bushing.

FIG. 4 is a right end elevation view of the handle bushing.

FIG. 9 is a plan view of an alternate embodiment of the socket, with remaining portions of the handle assembly broken away, showing the mark indicating the location of the tilt portion of the bushing passage.

DETAILED DESCRIPTION OF THE INVENTION

Figure 1:
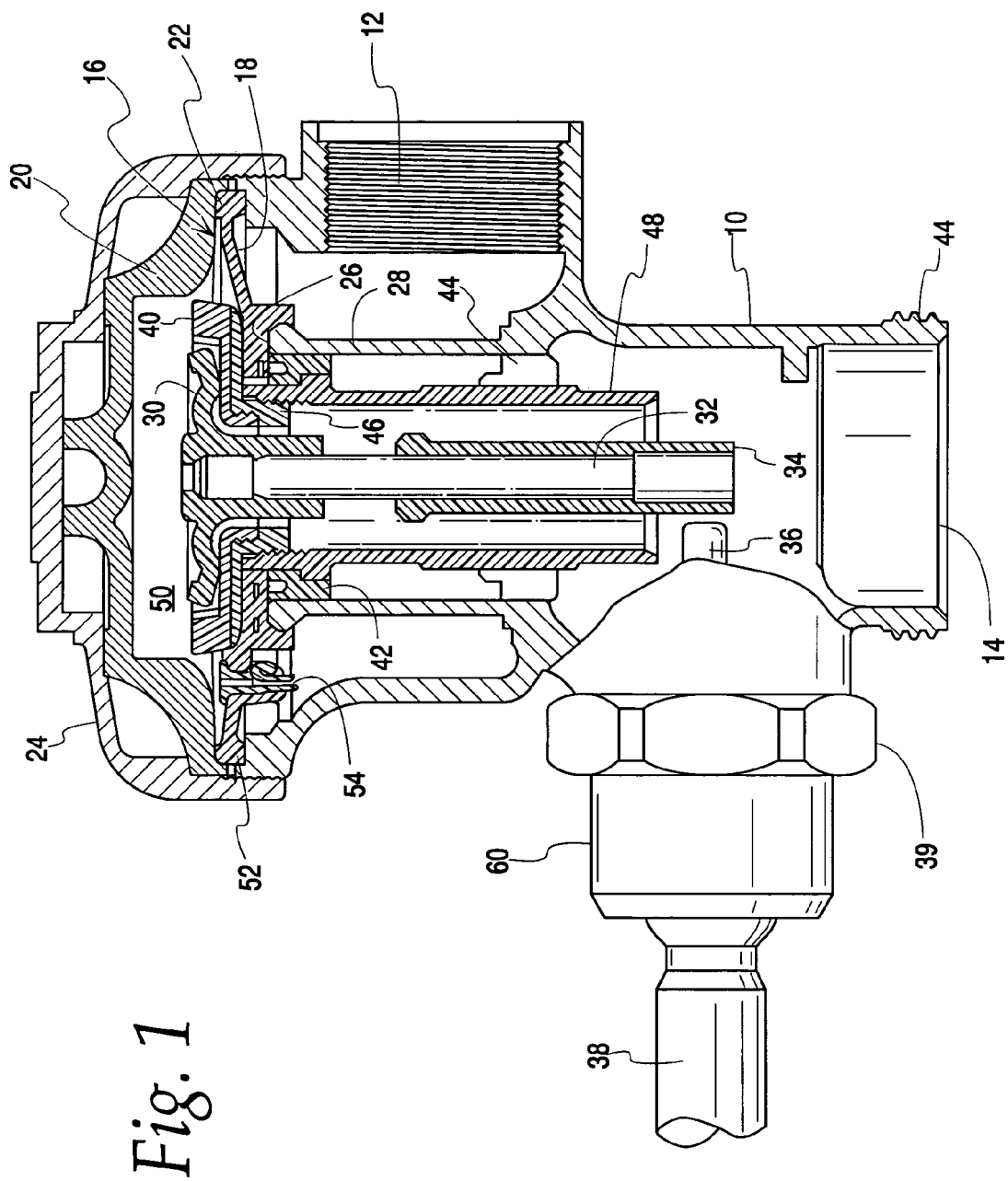
FIG. 1 is a partial section through a flush valve body.

The flush valve of the present invention includes a body 10 having an inlet 12 and an outlet 14. When installed the inlet is connected to a water supply and the outlet is connected to a fixture such as a toilet or urinal. A valve member is indicated generally at 16. In the illustrated embodiment the valve member is a diaphragm assembly but it could be otherwise, such as a piston assembly. The valve member includes a diaphragm 18 peripherally held to the body 10 by an inner cover 20. The diaphragm is seated upon a shoulder 22 at the upper end of body 10 and the peripheral edge 52 of the diaphragm is clamped in this position by the inner cover 20. An outer cover 24 is screw threaded onto the body to hold the inner cover in position.

The diaphragm assembly 16, as shown in FIG. 1, is closed upon a valve seat 26 formed at the upper end of a barrel 28. The barrel 28 forms the fluid conduit connecting the valve seat with outlet 14. The diaphragm assembly 16 includes a relief valve 30 having a downwardly extending stem 32 telescopically carrying a movable sleeve 34. Sleeve 34 is positioned for contact by a plunger 36 when operated by a handle 38. The handle 38 is part of a handle assembly which will be described in further detail below. The handle assembly is retained on the valve body by a nut 39.

The diaphragm assembly 16, in addition to diaphragm 18 and the relief valve 30, includes a retaining disk 40, a refill ring 42 and a flow control ring 44. The underside of the retaining disk 40 is threadedly attached to a collar 46, which in turn is threadedly attached at its exterior to a sleeve 48 which carries the refill ring 42. The above described assembly of elements firmly holds the diaphragm 18 between the upper face of the refill ring 42 and a lower facing surface of the collar 46. Above the diaphragm assembly 16 is a pressure chamber 50 which maintains the diaphragm assembly in a closed position when the flush valve is not in use.

As is known in the art, when the handle 38 is operated, the plunger 36 will contact sleeve 34, tilting the relief valve 30 off its seat on the retaining disk 40. This will permit the discharge of water within the pressure chamber 50 down through the sleeve 48. Inlet pressure will then cause the diaphragm to move upwardly off its seat 26, permitting direct communication between the inlet 12 and the outlet 14 through the space between the bottom of the diaphragm assembly and the seat 26. The raising of the diaphragm 16 also lifts the relief valve sleeve 34, allowing it to clear the plunger 36 even if the user has held the handle 38 in an actuated position. Once the sleeve clears the plunger the relief valve reseats on the retaining disk 40. As soon as this operation has taken place, the pressure chamber 50 will begin to fill through the filter and bypass orifice 54 in the diaphragm assembly. As flow continues into the pressure chamber 50, the diaphragm assembly will move back down toward its valve seat 26 and when it has reached that position, the flush valve will be closed.

FIGS. 2-4 illustrate the handle assembly 56 of the present invention. The handle assembly fits through an opening in the valve body and is retained therein by the nut 39 (FIG. 1) in the conventional manner. The handle assembly includes the handle 38 which has a face plate 58 at its inner end. The face plate is held within a chamber formed by a handle socket 60. An inwardly extending flange 62 on the socket's outer end retains the handle face plate 58. A sleeve 64 may line the socket chamber and flange 62. The inner end of the socket is threaded to the bushing 66 of the present invention. The bushing has a central sleeve 68 and an outer skirt 70 joined by a wall 72. The skirt 70 is threaded to the socket 60. The inner end of the sleeve has a beveled nose 74 that mounts a handle packing or seal 76. The sleeve has a passage 78 therethrough that receives the shank 80 of the plunger 36. Further details of the passage 78 will be described below. There is a head 82 on the outer end of the plunger shank. The head 82 engages the face plate 58 of the handle. A compression spring 84 or other suitable biasing device fits between the bushing and the head 82 to urge the plunger into engagement with the face plate 58 of handle 38. The wall 72 may also have an indicia thereon which indicates which side of the bushing has the angled axis. The indicia may be in the form of a depression 86 in the wall. Other markings are possible. This will assist the installer in orienting the bushing properly.

Figure 8:
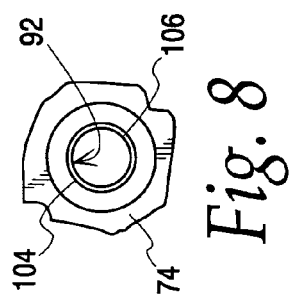
FIG. 8 is a schematic end elevation view of the inner end of the handle bushing's sleeve, illustrating the shape of the passage opening at the inner end.
Figure 7:
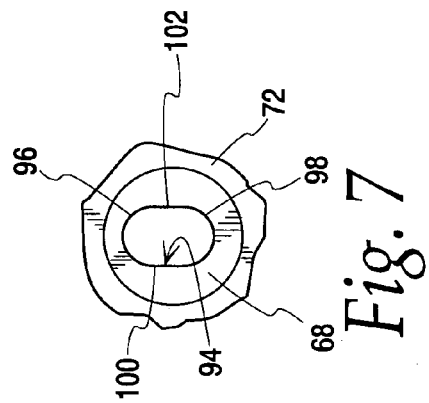
FIG. 7 is a schematic end elevation view of the outer end of the handle bushing's sleeve, illustrating the shape of the passage opening at the outer end.

Turning now to FIGS. 5-8, details of the bushing's passage 78 are shown. The passage can be considered to be defined by first and second bores 88 and 90 extending through the sleeve 68. The bores are preferably centered on the same vertical plane. The first bore 88 is horizontal and defines a horizontal plunger travel axis A. The second bore 90 is not horizontal. It is tilted upwardly at the outer end of the sleeve and defines an angled plunger travel axis B. The second bore can be considered a tilt portion of the bushing passage 78. The bores preferably each have a diameter slightly greater than that of the plunger shank 80. The bores overlap and merge together at the inner end of the sleeve so that they define a substantially circular opening 92 at the inner end. At the outer end of the sleeve the second bore 90 is above the first bore 88. As seen in FIG. 7, the opening 94 at the outer end of the sleeve includes an upper arcuate portion 96, a lower arcuate portion 98, and a pair of extension portions 100 and 102 joining the upper and lower arcuate portions. The result is a somewhat oval, although not strictly elliptical, shaped opening 94. As seen in FIG. 8, the opening 92 at the inner end of the sleeve includes an upper arcuate portion 104, a lower arcuate portion 106. In a preferred embodiment the height of the extension portions at the opening has shrunk to essentially zero so the arcuate portions 104 and 106 join one another.

It can be seen that the diameter of the plunger is just slightly less than that of the inner opening 92. Thus, the plunger can slide and tilt freely in the opening 92 but it cannot move up, down or sideways appreciably. This contrasts with the opening 94 which permits appreciable up and down movement of the plunger at that point. The result of the combination of the two sleeve bores and their openings is the plunger can tilt up and down as well as slide axially.

Figure 5:
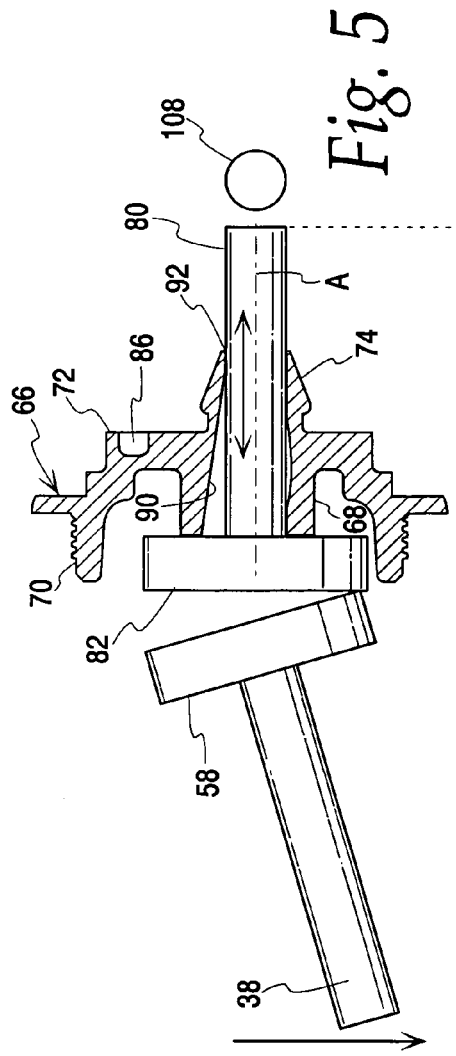
FIG. 5 is a schematic sectional representation of the handle bushing of the present invention, showing the handle and plunger travel for a full flush.
Figure 6:
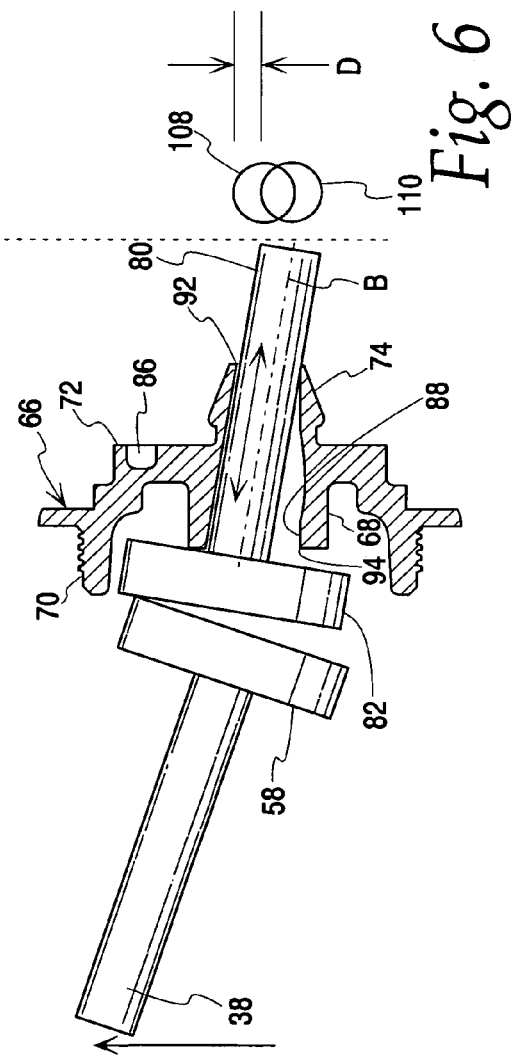
FIG. 6 is a schematic sectional representation of the handle bushing of the present invention, showing the handle and plunger travel for a partial or reduced volume flush.

The operation of the handle assembly will now be described. FIG. 5 shows the handle in an actuated position where it has been moved down by a user. Downward movement of the handle causes the face plate 58 to pivot about the lower portion of plate (which remains in contact with the socket flange 62) with the lower portion of plate 58 moving to the right, as seen in FIG. 5. This places a force $F_{handle}$ on the lower portion of the plunger head 82. With the noted forces $F_{bushing}$ on the plunger, the plunger remains centered on the horizontal plunger travel axis A. A diagrammatic end view of the plunger shank is shown at 108. FIG. 6 shows the handle in an actuated position where it has been moved up by a user. Upward movement of the handle causes the face plate 58 to pivot about the upper portion of plate with the upper portion of plate 58 moving to the right, as seen in FIG. 6. This places a force $F_{handle}$ on the upper portion of the plunger head 58. With the noted forces $F_{bushing}$ on the plunger, the plunger tilts upward at the left end and downward at the right end, taking the plunger into the second bore 90 where it is aligned with the angled plunger travel axis B. This lowers the inner tip of the plunger. A diagrammatic end view of the plunger tip when on axis B is shown at 110 in FIG. 6. The end view of plunger tip 108 on the horizontal axis A is also represented in FIG. 6 to illustrate the vertical drop D of the plunger tip on axis B as compared to when the plunger travels on axis A.

It can be appreciated by looking at FIG. 1 that dropping the plunger tip to position 1-10 by angling the plunger shank will permit the sleeve 34 of the relief valve to clear the plunger tip sooner than is the case when the plunger travels on the horizontal axis and the tip is at position 108. As a result of the earlier plunger clearance, the relief valve 30 closes sooner. This allows reestablishment of the pressure in chamber 50 sooner, resulting in earlier closure of the diaphragm and lesser volume per flush cycle. So when the user pushes the handle 38 upwardly, the plunger will be angled downwardly and there will be a reduced flush. When the user pushes the plunger in any direction but up, the plunger will move on the horizontal axis and the full volume flush will result.

Alternate configurations of the bushing passage are possible. For example, instead of having the widened opening of the passage at the outside end of the sleeve, it could be at the inner end. Or, instead of having the lowermost edge of the passage be horizontal and the uppermost edge be angled as shown, this arrangement could be reversed. A further alternative is to provide a sleeve passage with a horizontal axis and an angled axis wherein the inner end of the plunger is angled above horizontal. In that case the horizontal travel, caused by an upward actuation of the handle, would provide the lower flush volume. Similarly, the upwardly angled travel, caused by a downward actuation of the handle, would provide the higher volume flush. Some shortening of the relief valve sleeve might be needed in conjunction with this setup. Yet another possible alternate construction of the bushing passage is to make the inside diameter of the bushing passage appreciably larger than the outside diameter of the plunger. This would cause the plunger to tilt somewhat no matter which direction the handle is actuated, but only tilting in the vertical plane would affect the volume of the flush.

FIG. 9 illustrates yet another feature of the present invention. As will be evident from the above description, the second bore 90 provides a tilt portion of the bushing passage 78. This produces a non-symmetrical configuration of the passage, as compared to having only a simple, single horizontal bore at 88. This can be seen in FIG. 7. In order to provide the vertical plunger tip drop D illustrated in FIG. 6 with the attendant lower flush volume, the bushing 66 must be installed on the valve body such that the first and second bores 88, 90 are oriented in a generally vertical plane with the second bore 90 on top. However, since the bores are in the interior of the bushing an installer can see neither the bores nor the indicia 86 once the bushing goes into the valve body. The present invention solves this problem by providing an externally-visible mark or indicator 112 showing the location of the second bore. In the illustrated embodiment the mark is simply a line which may be suitably printed on a label that is attached to the exterior portion 114 of the socket 60. The label may optionally carry additional graphics 116 to instruct the user regarding the availability of the reduced flush alternative. Instead of a label, the mark 112 could be engraved or otherwise formed directly on the socket. The mark 112 can be used in conjunction with the indicia 86 on the bushing 66. That is, at the time of installation of the handle assembly on to the valve body, the installer can look to ensure that the mark 112 is rotationally aligned with the indicia 86 and then make sure that the mark 112 is at the top of the handle assembly when the nut 39 is tightened. This will result in the bushing passage 78 having the proper orientation relative to the valve body 10 and relief valve sleeve 34. Further assurance of proper alignment may be added by placing a flat 118 on the external flange of the bushing. Aligning the mark 112 with the flat 116 during assembly of the handle and then placing the mark at the top of the handle during installation of the handle assembly will result in the correct orientation.

While the preferred form of the invention has been shown and described herein, it should be realized that there may be many modifications, substitutions and alterations thereto. For example, the arcuate portions 96 and/or 98 may be fully semi-circular or they could extend somewhat less than a full 180°. Also, while a circular cross section for the plunger shank and the opening 92 is preferred, it could be otherwise so long as the plunger is free to slide.

I claim:

1. A dual mode flush valve, comprising a body having an inlet and an outlet, a valve seat between said inlet and outlet, a valve member movable to a closing position on said valve seat to control water flow between said inlet and outlet, a pressure chamber defined in said body above said valve member, a relief valve mounted on the valve member for movement between seated and unseated positions which close and open the pressure chamber, respectively, a handle assembly mounted on the body and including an actuatable handle, a bushing having a passage defined therethrough and a plunger slidably and tiltably mounted in said bushing passage, the plunger having an outer end in engagement with the handle and an inner end engageable with the relief valve, the plunger being movable to unseat the relief valve, the bushing passage defining both a first axis of plunger travel and a second axis of plunger travel which is angled with respect to the first axis of plunger travel, wherein tilting of the handle in a first direction moves the plunger along the first axis of plunger travel and tilting of the handle in a second direction tilts the plunger and moves the plunger along the second axis of plunger travel.

2. The flush valve of claim 1 wherein the bushing passage has an inner end proximate the relief valve stem and an outer end proximate the handle, the inner end having a opening smaller than an opening of the outer end such that the first axis of plunger travel and the second axis of plunger travel cross substantially at the inner end of the bushing passage and are spaced apart at the outer end of the bushing passage.

3. The flush valve of claim 2 wherein the first axis of plunger travel is substantially horizontal and the second axis of plunger travel is partially above the first axis of plunger travel at the outer end of the bushing passage.

4. The flush valve of claim 1 further comprising an indicia on the exterior of the handle assembly to identify the location of at least one of the first axis of plunger travel and the second axis of plunger travel.

5. The flush valve of claim 1 wherein the first axis of plunger travel and the second axis of plunger travel define a vertical plane.

6. The flush valve of claim 1 wherein the handle assembly further comprises a socket engageable with the valve body, the socket having a mark thereon visible from the exterior of the valve body and indicative of the orientation of the second axis of plunger travel.

7. In a flush valve of the type having a body with an inlet and an outlet, a valve seat between said inlet and outlet, a valve member movable to a closing position on said valve seat to control water flow between said inlet and outlet, a pressure chamber defined in said body above said valve member, a relief valve mounted on the valve member for movement between seated and unseated positions which close and open the pressure chamber, respectively, a handle assembly mounted on the body and including an actuatable handle, a bushing having a sleeve with a passage defined therethrough and a plunger mounted for sliding and tilting in said bushing passage, the plunger having an outer end in engagement with the handle and an inner end engageable with the relief valve, the plunger being movable to unseat the relief valve, a method of operating a flush valve in a dual mode comprising the step of adjusting the flush volume by tilting the inner end of the plunger to alter the location at which it contacts the relief valve.

8. The method of claim 7 wherein the tilting step is characterized by tilting the inner end of the plunger downwardly to reduce the flush volume.

9. In a flush valve including a valve body, a handle assembly comprising:
  a socket engageable with the valve body, the socket having an exterior portion visible from the exterior of the valve body when the handle assembly is attached to the valve body;
  a handle pivotably engaged with the socket;
  a bushing engageable with the socket and having a non-symmetrical bushing passage defined therethrough, said passage including a tilted portion;
  a plunger mounted for sliding and tilting in said non-symmetrical bushing passage and having an outer end in engagement with the handle, the socket having a mark on said exterior portion indicative of the location of the tilted portion of the non-symmetrical bushing passage.

10. The handle assembly of claim 9 further comprising an indicia indicative of the location of the tilt portion of the non-symmetrical bushing passage.

11. The handle assembly of claim 10 wherein the mark and the indicia are aligned with one another.

12. A system for operating a water flush valve in a plurality of flush volume modes, comprising a user handle operable in at least a first and second direction to cause a face plate to pivot about a plurality of portions of the face plate; and the face plate of the system coupled to the user handle and constructed to respond to handle motion by at least the following:

(1) motion in a first handle direction of the user handle causing the face plate to pivot about a first face plate portion of the face plate moving in a first face plate direction and a coupled lower portion of a plunger head and coupled shank remaining substantially centered on a horizontal axis of travel such that an end view of the shank remains substantially centered on the horizontal axis of travel, thereby releasing a first volume of water for flushing purposes and (2) motion in a second handle direction of the user handle causing the face plate to pivot about a second face plate portion of the face plate moving in a second face plate direction and a coupled upper portion of the plunger head and the coupled shank displaced away from a center of the horizontal axis of travel such that an end view of the shank is displaced from the horizontal axis of travel, thereby releasing a second volume of water for flushing purposes.

13. The system as defined in claim 12 further including a bushing passage having a first axis and a second axis not coaxial to the first axis.

14. The system as defined in claim 12 wherein the first axis and the second axis intersect.

15. The system as defined in claim 12 further including a stem coupled to a relief valve, the shank engaging the stem at a first stem position when the user handle is moved in a first handle direction and the shank engaging the stem at a second stem position when the user handle is moved in a second handle direction.

16. The system as defined in claim 15 wherein the first stem position is a first vertical position on the stem and the second stem position is a second vertical position on the stem.

17. The system as defined in claim 12 wherein the first face plate portion comprises a lower portion of the face plate and the second face plate portion comprises an upper portion of the face plate.

18. A retrofit system for a flush valve system which can provide at least two flush volumes of water during operation, comprising:
  a user handle and coupled face plate
  a bushing portion of a valve system having a bushing passage to receive a plunger, the plunger engagable with the user handle face plate at a first end and the bushing passage configured to accommodate a tilting of the first end of the plunger and a pivoting of the plunger about a pivot point defined within the bushing passage; and
  the user handle operable in at least a first direction and a second direction wherein actuation of the user handle in the first direction causes the plunger to move laterally through the bushing passage causing release of a first volume of water and actuation of the user handle in the second direction causing the plunger to tilt about the point within the bushing passage and to move through the bushing passage causing release of a second volume of water.

19. The retrofit system as defined in claim 18 wherein a first plunger travel axis is disposed substantially horizontally in the bushing passage and a second plunger travel axis is disposed within the bushing passage at an angle to the first plunger travel axis.

20. The retrofit system as defined in claim 18 wherein the first and second plunger travel axis are nonparallel.

21. The retrofit system as defined in claim 18 wherein a first plunger travel axis and a second plunger travel axis share a common plane.

22. The retrofit system as defined in claim 21 wherein the first axis and second axis intersect at the pivot point within the passage.

23. A system for a flush valve which can provide at least two flush volumes of water during operation, comprising:
a user handle operable in at least a first and second direction to cause a face plate to pivot about at least a respective first face plate direction and a second face plate direction;
a plunger mechanism having a plunger coupled to the user handle; and
a bushing receiving the plunger into a bushing passage and the plunger positioned in the bushing passage such that movement of the user handle in the first direction causes the face plate to pivot about the first face plate direction engaging the plunger to move a first distance associated with a first flush volume of water and movement of the user handle in the second direction causes the face plate to pivot about the second face plate direction engaging the plunger to move a second distance associated with a second flush volume of water.

24. The system as defined in claim 23 further including a stem coupled to a valve for release of flush water, wherein the plunger mechanism engages the stem at a first position when the user handle is moved in the first direction and the plunger mechanism engages the stem at a second position when the user handle is moved in the second direction.

25. The system as defined in claim 24 wherein the first position comprises a first vertical position on the stem and the second position comprises a second vertical position on the stem.

26. The system as defined in claim 23 wherein the plunger moves along a first axis of the bushing passage when the user handle is operated in the first direction and the plunger moves along a second axis of the bushing passage when the user handle is operated in the second direction.

27. The system as defined in claim 26 wherein the first axis and the second axis intersect.

28. A system for operating a water flush valve in a plurality of flush volume modes, comprising:
a user handle and face plate coupled via a plunger;
a valve stem coupled to a relief valve;
a bushing portion of a valve system having a bushing passage to receive the plunger and the bushing passage having an irregular shape enabling the plunger to have different angles of tilt depending on the direction a user moves the user handle which is coupled to the plunger; and
the face plate being coupled to the plunger such that movement of the user handle in a first direction causes the plunger and coupled face plate to achieve a first tilt angle in the bushing passage and move the valve stem a first displacement providing a first flush volume and
movement of the user handle in a second direction causes the plunger and coupled face plate to achieve a second tilt angle in the bushing passage and move the valve stem a second displacement providing a second flush volume.

29. A system for operating a water flush valve in a plurality of flush volume modes, comprising a body having an inlet and an outlet, a valve seat between said inlet and outlet, a valve member movable to a closing position on said valve seat to control water flow between said inlet and said outlet, a pressure chamber defined in said body, a relief valve mounted on the valve member for movement between seated and unseated positions which close and open the pressure chamber, respectively, a handle assembly mounted on the body and including an actuatable handle for achieving a plurality of flush volumes, a bushing coupled to the handle and having a non-symmetrical cross-section passage defined therethrough and a plunger mounted for sliding and tilting within said bushing having the non-symmetrical cross-section passage, the plunger having an outer end in engagement with the handle and an inner end engageable with the relief valve, the plunger being movable to unseat the relief valve, and the non-symmetrical cross-section passage of the bushing establishing at least a first axis of plunger travel and a second axis of travel which is angled relative to the first axis of plunger travel, thereby enabling release of a plurality of different flush volumes of water with each different volume of water associated with one of the different first axis and second axis of travel of the plunger.

30. The system as defined in claim 29 wherein the handle assembly is mounted such that movement of the user handle in a first direction causes the plunger to achieve the at least first axis of plunger travel and movement of the user handle in a second direction causes the plunger to achieve the at least second axis of plunger travel.

31. A dual mode flush valve, comprising:
a body having an inlet and an outlet,
a valve seat between said inlet and outlet,
a valve member movable to a closing position on said valve seat to control water flow between said inlet and outlet,
a pressure chamber defined in said body above said valve member,
a relief valve mounted on the valve member for movement between seated and unseated positions which close and open the pressure chamber, respectively,
an actuatable handle having an actuable handle face plate,
a plunger having a plunger face plate at a first end and engagable with the relief valve stem at a second end, the handle face place and plunger face plate adjacent and the plunger mounted for sliding and tilting within a passage of a bushing,
the handle face plate configured to pivot in a first direction to cause the plunger to travel longitudinally through the passage along a first axis striking the relief valve stem at a first location and configured to pivot in a second direction to cause the plunger to pivot about a point within the passage and travel along an angled axis of travel striking the relief valve stem at a second location.

32. A system for providing at least two flush volumes, comprising:
a body having an inlet and an outlet, a valve seat between said inlet and outlet, a valve member movable to a closing position on said valve seat to control water flow between said inlet and outlet, a pressure chamber defined in said body above said valve member, a relief valve mounted on the valve member for movement between seated and unseated positions which close and open the pressure chamber, respectively, a handle assembly mounted on the body and including an actuatable handle which when moved in a first direction causes release of a first flush volume and when moved in a second direction causes release of a second flush volume, a bushing having a passage defined there through and a plunger slidably and tiltably mounted in said bushing passage, the plunger having an outer end in engagement with the handle and an inner end engagable with the relief valve, the plunger being movable to unseat the relief valve, the passage defining both a first axis of plunger travel corresponding to the first flush volume and a second axis of plunger travel which is angled with respect to the first axis of plunger travel and corresponding to the second flush volume.

33. A flush valve comprising:

a handle and a plunger in operative communication, the plunger slidable and tiltable within a bushing in the flush valve;

a passage through the bushing, the passage defining a first opening and a second opening, one of said openings having a lower arcuate portion, an upper arcuate portion and a pair extension portions joining the upper and lower arcuate portions, the other of said openings having a lower arcuate portion and an upper arcuate portion substantially joined to one another, the bushing thereby enabling operation of the handle assembly to release at least two different volumes of water from the flush valve.

34. The flush valve of claim 33 wherein the length of the extension portions reduces uniformly from a maximum at said one opening to substantially zero at the other of said openings.

35. The flush valve of claim 33 wherein said one of said opening having a lower arcuate portion is the first opening and further wherein the first opening is proximate the handle and the second opening is opposite therefrom.

* * * * *

UNITED STATES PATENT AND TRADEMARK OFFICE
CERTIFICATE OF CORRECTION

PATENT NO. : 7,607,635 B2  
APPLICATION NO. : 11/211273  
DATED : October 27, 2009  
INVENTOR(S) : Wilson Page 1 of 1

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by 654 days.

Delete the phrase "by 654 days" and insert -- by 989 days --

Signed and Sealed this

Twenty-fifth Day of May, 2010

David J. Kappos  
*Director of the United States Patent and Trademark Office*

(12) EX PARTE REEXAMINATION CERTIFICATE (8577th)
United States Patent
Wilson

(10) Number: US 7,607,635 C1
(45) Certificate Issued: Sep. 27, 2011

(54) FLUSH VALVE HANDLE ASSEMBLY PROVIDING DUAL MODE OPERATION

(75) Inventor: John R. Wilson, Naperville, IL (US)

(73) Assignee: Sloan Valve Company, Franklin Park, IL (US)

Reexamination Request:
No. 90/009,826, Sep. 17, 2010

Reexamination Certificate for:
Patent No.: 7,607,635
Issued: Oct. 27, 2009
Appl. No.: 11/211,273
Filed: Aug. 25, 2005

Certificate of Correction issued May 25, 2010.

(51) Int. Cl.
*F16K 31/12* (2006.01)

(52) U.S. Cl. .......................... 251/40; 251/38
(58) Field of Classification Search .................. None
See application file for complete search history.

(56) References Cited

U.S. PATENT DOCUMENTS

| | | |
|---|---|---|
| 605,621 A | 6/1898 | Acklin |
| 934,353 A | 9/1909 | Prichett |
| 1,114,398 A | 10/1914 | Sloan |
| 1,323,703 A | 12/1919 | Linfoot |
| 1,479,313 A | 1/1924 | Pallavicini |
| 1,519,654 A | 12/1924 | Banta |
| 1,858,591 A | 7/1932 | Tanner |
| 1,868,520 A | 7/1932 | Brooks |
| 1,896,950 A | 2/1933 | Groeniger |
| 1,912,937 A | 6/1933 | George |

(Continued)

FOREIGN PATENT DOCUMENTS

| WO | WO2005/124210 | 12/2005 |
|---|---|---|
| WO | WO2007/098269 | 8/2007 |

OTHER PUBLICATIONS

Six–Liter Water Closets Equipped With a Dual Flushing Device, American Society of Mechanical Engineers, ASME A112.19.14–2006, Published Jul. 10, 2006.
"Dual Flush Devices For Water Closets," American Society of Mechanical Engineers, ASME A112.19.10–2003, Published Jul. 15, 2003.
"Dual Flush Devices For Water Closets," American Society of Mechanical Engineers, ASME A112.19.10–1994, Published 1994.
"Pressurized Flushing Devices (Flushometers) for Plumbing Fixtures," American Society of Sanitary Engineering, ASSE Standard #1037, Published Mar. 1990.
U.S. Appl. No. 95/001,187, filed Jul. 10, 2009, Funari.
U.S. Appl. No. 60/579,396, filed Jun. 14, 2004, Funari.
Six–Liter Water Closets Equipped with a Dual Flushing Device, An American National Standard, The American Society of Mechanical Engineers, ASME A112.19.14–2001, Aug. 1, 2002.
"EX 500 Flish Valve Study," Bates numbers SVC0317842–SVC0317886, *Sloan Valve Co. v. Zurn Industries, Inc. et al.*, United States District Court for the Northern District of Illinois, Eastern Division, Case No. 1:10–cv–00204.

*Primary Examiner* — Patricia Engle

(57) ABSTRACT

A dual mode flush valve includes a handle assembly having a handle, a bushing and a plunger. The bushing has a sleeve with a passage therethrough for mounting the plunger for sliding and tilting. The passage is defined by first and second partially overlapping bores that coincide at the inner end of the sleeve and are spaced one above the other at the outer end of the sleeve. The bores define a horizontal plunger travel axis and an angled plunger travel axis. Depending on which direction the user actuates the handle the plunger will travel along one of these axes. Travel along the angled axis will lower the plunger tip, allowing earlier clearance of a relief valve and a reduced flow through the flush valve compared to actuation with the plunger travel along the horizontal axis.

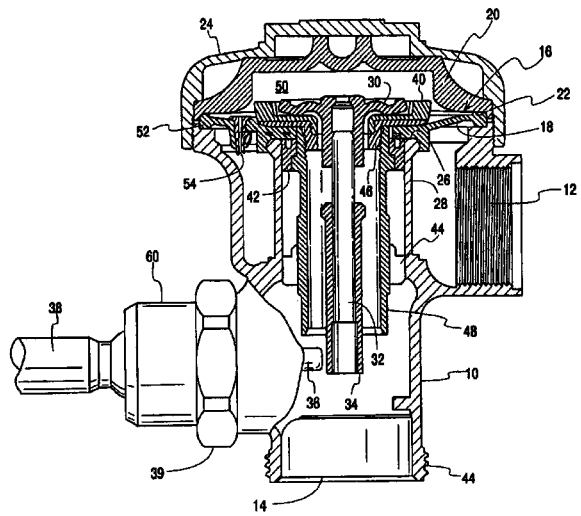

U.S. PATENT DOCUMENTS

| | | |
|---|---|---|
| 1,992,381 A | 2/1935 | Lyons |
| 2,038,135 A | 4/1936 | Sloan |
| 2,136,221 A | 11/1938 | Sloan |
| 2,164,760 A | 7/1939 | Wesson |
| 2,210,860 A | 8/1940 | Regnell |
| 2,369,104 A | 2/1945 | Frederickson |
| 2,472,576 A | 6/1949 | Dobrick |
| 2,511,545 A | 6/1950 | Roselair |
| 2,612,187 A | 9/1952 | Romanelli et al. |
| 2,620,826 A | 12/1952 | Johns |
| 2,734,712 A | 2/1956 | Fraser |
| 2,738,946 A | 3/1956 | Filliung |
| 2,775,772 A | 1/1957 | Clarke |
| 2,858,846 A | 11/1958 | Parker |
| 3,026,536 A | 3/1962 | Wood |
| 3,085,779 A | 4/1963 | Phillippe |
| 3,141,177 A | 7/1964 | Kertell |
| 3,207,467 A | 9/1965 | Bühler |
| 3,211,416 A | 10/1965 | Billeter |
| 3,279,742 A | 10/1966 | Billeter |
| 3,334,359 A | 8/1967 | Weingartner |
| 3,365,730 A | 1/1968 | Chiappetta |
| 3,380,077 A | 4/1968 | Armstrong |
| 3,399,860 A | 9/1968 | Billeter et al. |
| 3,406,940 A | 10/1968 | Kertell |
| 3,419,912 A | 1/1969 | Kertell |
| 3,635,103 A | 1/1972 | Monti |
| 3,695,254 A | 10/1972 | Blum |
| 3,745,591 A | 7/1973 | Girten |
| 3,775,778 A | 12/1973 | Lee |
| 3,778,023 A | 12/1973 | Billeter |
| 3,787,902 A | 1/1974 | McCombs |
| 3,806,962 A | 4/1974 | Sievers |
| 4,022,380 A | 5/1977 | Scragg |
| 4,025,968 A | 5/1977 | Davis |
| 4,080,669 A | 3/1978 | Biggerstaff |
| 4,101,986 A | 7/1978 | Ng et al. |
| 4,114,204 A | 9/1978 | Blach |
| 4,134,570 A | 1/1979 | Walker |
| 4,135,263 A | 1/1979 | Anderson |
| 4,160,294 A | 7/1979 | Crumby |
| 4,202,525 A | 5/1980 | Govaer et al. |
| 4,240,168 A | 12/1980 | Duke |
| 4,272,052 A | 6/1981 | Gidner |
| 4,327,891 A | 5/1982 | Allen et al. |
| 4,576,272 A | 3/1986 | Morgan, Jr. et al. |
| 4,817,913 A | 4/1989 | Whiteside |
| 4,883,254 A | 11/1989 | Whiteside |
| 4,893,645 A | 1/1990 | Augustinas et al. |
| 5,026,021 A | 6/1991 | Pino |
| 5,062,453 A | 11/1991 | Saadi et al. |
| 5,244,179 A | 9/1993 | Wilson |
| 5,415,374 A | 5/1995 | Carroll et al. |
| 5,431,181 A | 7/1995 | Saadi et al. |
| 5,476,244 A | 12/1995 | Carroll et al. |
| 5,497,802 A | 3/1996 | Whiteside |
| 5,505,427 A | 4/1996 | Whiteside |
| 5,535,781 A | 7/1996 | Paterson et al. |
| 5,730,415 A | 3/1998 | Gronwick |
| 5,881,993 A | 3/1999 | Wilson et al. |
| 6,019,343 A | 2/2000 | Tsai |
| 6,056,261 A | 5/2000 | Aparicio et al. |
| 6,094,753 A | 8/2000 | Korte |
| 6,112,763 A | 9/2000 | Orbell |
| 6,120,189 A | 9/2000 | Beagle et al. |
| 6,173,456 B1 | 1/2001 | Nieto |
| 6,178,567 B1 | 1/2001 | Bliss |
| 6,189,554 B1 | 2/2001 | Pino |
| 6,227,219 B1 | 5/2001 | Pino |
| 6,240,826 B1 | 6/2001 | Zernickel et al. |
| 6,263,520 B1 | 7/2001 | Song |
| 6,282,731 B1 | 9/2001 | Mohrman |
| 6,299,127 B1 | 10/2001 | Wilson |
| 6,317,899 B1 | 11/2001 | Brewer |
| 6,336,229 B1 | 1/2002 | Guo |
| 6,385,786 B1 | 5/2002 | Lester |
| 6,408,873 B1 | 6/2002 | Hall et al. |
| 6,442,772 B2 | 9/2002 | Han et al. |
| 6,467,100 B2 | 10/2002 | Leach |
| 6,484,327 B2 | 11/2002 | Hand |
| 6,510,563 B1 | 1/2003 | Jarosinski et al. |
| 6,554,018 B1 | 4/2003 | Pino |
| 6,604,249 B2 | 8/2003 | Han et al. |
| 6,643,855 B1 | 11/2003 | Huang |
| 6,651,265 B2 | 11/2003 | Kwen |
| 6,704,945 B2 | 3/2004 | Bellmore |
| 6,729,602 B2 | 5/2004 | Hankin, Jr. et al. |
| 6,785,913 B2 | 9/2004 | Ho |
| 6,823,534 B2 | 11/2004 | Li |
| 6,829,787 B1 | 12/2004 | Pipenburg |
| 6,898,808 B2 | 5/2005 | Molho et al. |
| 6,905,108 B2 | 6/2005 | Hall et al. |
| 7,062,801 B2 | 6/2006 | Oliver |
| 7,481,413 B2 | 1/2009 | Funari |
| 7,607,635 B2 | 10/2009 | Wilson |
| 2002/0047102 A1 | 4/2002 | Hankin et al. |
| 2003/0089867 A1 | 5/2003 | Hall et al. |
| 2003/0110555 A1 | 6/2003 | Tate |
| 2005/0050625 A1 | 3/2005 | Bayer |
| 2006/0033060 A1 | 2/2006 | Funari |
| 2006/0151729 A1 | 7/2006 | Wilson |
| 2009/0133186 A1 | 5/2009 | Maercovich |
| 2010/0006155 A1 | 1/2010 | Funari |

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 7-11, 28-31, 33, and 34 is confirmed.

Claims 1, 12 and 18 are determined to be patentable as amended.

Claims 4, 5, 6, 14 and 19, dependent on an amended claim, are determined to be patentable.

New claims 36-46 are added and determined to be patentable.

Claims 2, 3, 13, 15-17, 20-27, 32, and 35 were not reexamined.

1. A dual mode flush valve, comprising a body having an inlet and an outlet, a valve seat between said inlet and outlet, a valve member movable to a closing position on said valve seat to control water flow between said inlet and outlet, a pressure chamber defined in said body above said valve member, a relief valve mounted on the valve member for movement between seated and unseated positions which close and open the pressure chamber, respectively, a handle assembly mounted on the body and including an actuatable handle, a bushing having a passage defined therethrough and a plunger slidably and tiltably mounted in said bushing passage, the plunger having an outer end in engagement with the handle and an inner end engagable with the relief valve, the plunger being movable to unseat the relief valve, the bushing passage defining both a first axis of plunger travel and a second axis of plunger travel which is angled with respect to the first axis of plunger travel, wherein tilting of the handle in a first direction moves the plunger along the first axis of plunger travel *providing a first flush volume of water adequate to evacuate solid waste* and tilting of the handle in a second direction tilts the plunger and moves the plunger along the second axis of the plunger travel *providing a second flush volume of water adequate to evacuate liquid waste*.

12. A system for operating a water flush valve in a plurality of *user selectable* flush volume modes *including a liquid waste removal mode and a solid waste removal mode*, comprising a user handle operable in at least a first and second direction to cause a face plate to pivot about a plurality of portions of the face plate; and the face plate of the system coupled to the user handle and constructed to respond to handle motion by at least the following: (1) motion in a first handle direction of the user handle causing the face plate to pivot about a first face plate portion of the face plate moving in a first face plate direction and a coupled lower portion of a plunger head and coupled shank remaining substantially centered on a horizontal axis of travel such that an end view of the shank remains substantially centered on the horizontal axis of travel, thereby releasing a first *flush* volume of water for *solid waste* flushing purposes *in the solid waste removal mode* and (2) motion in a second handle direction of the user handle causing the face plate to pivot about a second face plate portion of the face plate moving in a second face plate direction and a coupled upper portion of the plunger head and the coupled shank displaced away from a center of the horizontal axis of travel such that an end view of the shank is displaced from the horizontal axis of travel, thereby releasing a second *flush* volume of water *adequate* for *liquid waste* flushing purposes *in the liquid waste removal mode*.

18. A retrofit system for a flush valve system which can provide at least two flush volumes of water during operation, *a first flush volume required for removal of solid waste and a second flush volume required for removal of liquid waste*, comprising:
  a user handle and coupled face plate;
  a bushing portion of a valve system having a bushing passage to receive a plunger, the plunger engagable with the user handle face plate at a first end and the bushing passage configured to accommodate a tilting of the first end of the plunger and a pivoting of the plunger about a pivot point defined within the bushing passage; and
  the user handle operable in at least a first direction and a second direction wherein actuation of the user handle in the first direction [causes] *causing* the plunger to move laterally through the bushing passage causing release of [a] *the* first *flush* volume of water *for removal of solid waste* and actuation of the user handle in the second direction causing the plunger to tilt about the point within the bushing passage and to move through the bushing passage causing release of a second *flush* volume of water *for removal of liquid waste*.

36. *A system for operating a water flush valve in a plumbing fixture for providing at least a user selectable full flush volume and a user selectable reduced flush volume for conservation of water resources, comprising a user handle operable in at least a first direction and a second direction to cause a face plate to pivot about a plurality of portions of the face plate; and the face plate of the system coupled to the user handle and constructed to respond to handle motion by at least the following: (1) motion by the user in a first handle direction of the user handle causing the face plate to pivot about a first plate portion of the face plate moving in a first face plate direction and a coupled lower portion of a plunger head and coupled shank remaining substantially centered on a horizontal axis of travel such that an end view of the shank remains substantially centered on the horizontal axis of travel, thereby releasing a full flush volume of water required for cleaning the plumbing fixture of solid waste and (2) motion by user in a second handle direction of the user handle causing the face plate to pivot about a second face plate portion of the face plate moving in a second face plate direction and a coupled upper portion of the plunger head and the coupled shank displaced away from a center of the horizontal axis of travel such that an end view of the shank is displaced from the horizontal axis of travel, so that the plunger is tilted to release the reduced flush volume for cleaning the fixture of liquid waste, thereby enabling the user to conserve water resources by selecting the reduced flush volume of water for liquid waste.*

37. *The system as defined in claim 36 further including a bushing passage for receiving the plunger and having the horizontal axis of plunger travel corresponding to the first* handle direction and an angled axis of plunger travel corresponding to the second handle direction.

38. The system as defined in claim 37 further comprising indicia on an exterior portion of the water flush valve to identify the location of at least one of the first axis of the bushing passage and the second axis of the bushing passage for plunger travel.

39. The system as defined in claim 37 further comprising a socket engageable with the body of the water flush valve, a visible mark on the socket indicative of the orientation of the first axis of plunger travel or the second axis of plunger travel, a nut separate from the socket to allow securing the socket to the body of the water flush valve such that the first axis of plunger travel and the second axis of plunger travel define a substantially vertical plane.

40. The system as defined in claim 37 further comprising indicia on an exterior portion of the water flush valve to identify for the user the direction of handle actuation to achieve the full flush volume of water and to achieve the reduced flush volume of water.

41. A handle assembly for a dual mode flush valve system for use with a plumbing fixture and which can provide at least two flush volumes of water during operation by a user selecting one of the at least two flush volumes of water for cleaning the plumbing fixture, comprising:

a user handle and coupled face plate;

a bushing portion of a valve system having a bushing passage to receive a plunger, the plunger engagable with the user handle face plate at a first end and the bushing passage configured to accommodate tilting of the first end of the plunger and a pivoting of the plunger about a pivot point within the bushing passage; and the user handle operable by user actuation in at least a first direction and a second direction wherein actuation of the user handle in the first direction causes the plunger to move laterally through the bushing passage causing release of a first reduced flush volume of water required for cleaning the plumbing fixture of liquid waste and actuation of the user handle in the second direction causing the plunger to tilt about the point within the bushing passage and to move through the bushing passage causing release of a second full flush volume of water required for cleaning the plumbing fixture of solid waste, thereby enabling the user to select an appropriate one of the first reduced flush volume of water or the second full flush volume of water to clean the fixture and thereby conserving water resources by enabling the user to select when appropriate the first reduced flush volume of water.

42. The system as defined in claim 41 wherein the bushing passage defines a first axis associated with actuation of the handle in the first direction and a second axis associated with actuation of the handle in the second direction.

43. The system as defined in claim 41 further comprising indicia on an exterior of the handle assembly to identify the location of at least one of the first direction of handle actuation and the second direction of handle actuation.

44. The system as defined in claim 42 further comprising a socket having a visible mark indicative of the orientation of the first axis of plunger travel or the second axis of plunger travel, a nut separate from the socket to allow securing the socket to the valve body such that the first axis of plunger travel and the second axis of plunger travel define a substantially vertical plane.

45. The system as defined in claim 41 further comprising indicia on an exterior portion of the handle assembly to identify for the user the direction of handle actuation to achieve the full flush volume of water and to achieve the reduced flush volume of water.

46. The system of claim 37, wherein the bushing passage has a substantially horizontal wall on one side and an angled wall on an other side, the angled wall being angled from horizontal, further wherein actuation of the user handle in the second direction causes the plunger to tilt within the bushing passage against the angled wall and to move through the bushing passage along the angled wall causing release of the reduced flush volume of water for removal of liquid waste.

* * * * *